US011810348B2

(12) United States Patent
Liu et al.

(10) Patent No.: US 11,810,348 B2
(45) Date of Patent: Nov. 7, 2023

(54) METHOD FOR IDENTIFYING POWER EQUIPMENT TARGETS BASED ON HUMAN-LEVEL CONCEPT LEARNING

(71) Applicant: Shanghai Jiaotong University, Shanghai (CN)

(72) Inventors: Yadong Liu, Shanghai (CN); Yingjie Yan, Shanghai (CN); Siheng Xiong, Shanghai (CN); Ling Pei, Shanghai (CN); Zhe Li, Shanghai (CN); Peng Xu, Shanghai (CN); Lei Su, Shanghai (CN); Xiaofei Fu, Shanghai (CN); Xiuchen Jiang, Shanghai (CN)

(73) Assignee: Shanghai Jiaotong University, Shanghai (CN)

( * ) Notice: Subject to any disclaimer, the term of this patent is extended or adjusted under 35 U.S.C. 154(b) by 405 days.

(21) Appl. No.: 17/210,530

(22) Filed: Mar. 24, 2021

(65) Prior Publication Data

US 2022/0083778 A1 Mar. 17, 2022

(30) Foreign Application Priority Data

Sep. 17, 2020 (CN) .................... 202010978271.X

(51) Int. Cl.
*G06V 20/20* (2022.01)
*G06N 3/08* (2023.01)
(Continued)

(52) U.S. Cl.
CPC .......... *G06V 20/20* (2022.01); *G06F 18/2113* (2023.01); *G06F 18/29* (2023.01); *G06N 3/08* (2013.01); *G06N 7/01* (2023.01)

(58) Field of Classification Search
CPC .... G06V 20/20; G06V 10/774; G06V 10/809; G06V 10/84; G06V 20/52;
(Continued)

(56) References Cited

U.S. PATENT DOCUMENTS

2014/0262134 A1* 9/2014 Arensmeier ............. F24F 11/36
165/11.2
2020/0387785 A1* 12/2020 He .......................... G06F 18/24
(Continued)

OTHER PUBLICATIONS

Wei C, Tao F, Lin Y, Liang X, Wang Y, Li H, Fang J. Substation equipment thermal fault diagnosis model based on ResNet and improved bayesian optimization. In2019 9th International Conference on Power and Energy Systems (ICPES) Dec. 10, 2019 (pp. 1-5). IEEE. (Year: 2019).*

(Continued)

*Primary Examiner* — Fayyaz Alam
(74) *Attorney, Agent, or Firm* — Idea Intellectual Limited; Margaret A. Burke; Sam T. Yip

(57) ABSTRACT

The present disclosure provide a method for identifying power equipment targets based on human-level concept learning, including: creating a dataset of power equipment images, and annotating power equipment in power equipment images; training neural network and Bayesian network with the annotated dataset and respectively acquire identification results and conditional probabilities; calculating probabilities of unions with the conditional probabilities; and filtering the identification result corresponding to the highest probability of the union as identification result of the dataset of the power equipment images and complete the identification of the power equipment. The present disclosure combines Mask R-CNN and probabilistic graphical model. The bottom layer uses Mask R-CNN, and the top layer uses Bayesian network to train in identifying power equipment images, so that a small amount of data samples can achieve good recognition, which improved the performance of Mask R-CNN model.

10 Claims, 3 Drawing Sheets

(51) Int. Cl.
*G06F 18/20* (2023.01)
*G06F 18/2113* (2023.01)
*G06N 7/01* (2023.01)

(58) Field of Classification Search
CPC .... G06F 18/2113; G06F 18/29; G06F 18/241; G06F 18/24155; G06N 3/08; G06N 7/01; G06N 3/045; G06T 7/0004; G06T 2207/10004; G06T 2207/20076; G06T 2207/20081; G06T 2207/20084; G06T 2207/30108
See application file for complete search history.

(56) References Cited

U.S. PATENT DOCUMENTS

2021/0048487 A1* 2/2021 He .................. G01R 31/62
2023/0077781 A1* 3/2023 Hutson .............. G01J 5/00

OTHER PUBLICATIONS

Xiao L, Mao Q, Lan P, Zang X, Liao Z. A fault diagnosis method of insulator string based on infrared image feature extraction and probabilistic neural network. In2017 10th International Conference on Intelligent Computation Technology and Automation (ICICTA) Oct. 9, 2017 (pp. 80-85). IEEE. (Year: 2017).*

Ferreira VH, Zanghi R, Fortes MZ, Gomes Jr S, da Silva AP. Probabilistic transmission line fault diagnosis using autonomous neural models. Electric Power Systems Research. Aug. 1, 2020;185:106360. (Year: 2020).*

* cited by examiner

METHOD FOR IDENTIFYING POWER EQUIPMENT TARGETS BASED ON HUMAN-LEVEL CONCEPT LEARNING

CROSS-REFERENCE TO RELATED APPLICATION

This application claims priority from Chinese patent application number 202010978271.X filed on Sep. 17, 2020; the disclosure of which is incorporated herein by reference in its entirety.

TECHNICAL FIELD

The present disclosure relates to the technical field of image identification. More particularly, it relates to a method for identifying power equipment targets based on human-level concept learning.

BACKGROUND

Monitoring equipment that carry high voltage is an effective means to ensure reliable power supply by power grid. With the implementation of the fixed position policy of China state-owned enterprises and the development of the power grid, problems of equipment monitoring have become increasingly prominent. If advanced detection and diagnosis technology can be used to realize unattended monitoring of key equipment in substation and automatic judgment of hidden dangers and abnormal conditions, it can greatly lighten the monitoring burden of front-line personnel and greatly improve the current level of substation operation and maintenance.

In the field of power equipment target identification, domestic and foreign scholars have conducted certain research and achieved certain achievements. In foreign countries, some scholars use infrared and visible light images to achieve wire detection purpose. First, obtain video stream image from the infrared and visible light sensors, then use image processing to determine whether the wire is malfunctioning, and display the composite stream image in real time. Besides transmission wires, some scholars have also tried to target on insulators. They proposed a video-based online detection method. This method uses information such as templates, histograms, and edges to consider the environment with different brightness, and is used for detecting tilted insulators and snowfall.

Six years ago, in China, it was pointed out that the development of image identification technology provided a technical guarantee for implementation of smart grids. It can solve the huge calculation problems in online monitoring of power equipment, which is a great significance of improving online monitoring of power equipment. A general method is to extract a moment invariant of a shape of a power equipment target after preprocessing the images of the substation collected by a camera, and use it as an eigenvector. Using a support vector machine (SVM) to identify the type of the power equipment, and determine if there is a fault with the image of the operating equipment and comparison image of a database. While training with the SVM, this method can only train two categories at a time. However, there are many types of power equipment, and the SVM needed to be used multiple times. Since the total running time is the sum of all SVM training times, the efficiency is very poor.

There are other methods to locate and identify annotations of the power equipment. These methods have their limits. On one hand, the resolution of the images may not meet the requirements for performing image recognition in some methods. On the other hand, it is not necessary to use image recognition for this work in some methods. In these methods, in order to reduce the running time of the image recognition algorithm, a template matching algorithm is used, and a specific part of the power equipment is used as a template to traverse and match the entire image. For example, to identify a transformer, one only need to find insulators in images, which greatly improved the efficiency of algorithm. However, the prerequisite for these methods is that the angle of the camera shooting the images is known and fixed, which means the shape and size of the shooting target need to be known.

SUMMARY OF THE DISCLOSURE

The benefit of the present disclosure: the present disclosure combines Mask R-CNN (region based convolutional neural networks) and probabilistic graphical model (PGM). The bottom layer uses Mask R-CNN, and the top layer uses Bayesian network to train in identifying power equipment images, so that a small amount of data samples can achieve good recognition, and successfully increased the mAP (mean average precision) value output by Mask R-CNN by 12%, which improved the performance of Mask R-CNN model.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiment 1

Grasping the status and environment of operating an equipment for power transmission or transformation, and discovering hidden dangers in the operation of a power grid equipment in time is a key issue in operating maintenance management of a power equipment. Due to the large number of equipment, complex operating environment, and the limitations of condition monitoring technology, how to accurately grasp the operating status of the equipment in time still need to be resolved urgently.

The problems with the current commonly used detection methods are: the existing online monitoring system is not highly recognized and has low value in use; traditional monitoring and real-time detection method cannot monitor the entire process of equipment operation due to a fixed inspection and test cycle, and may not be able to discover hidden equipment hazards in time; the currently used substation patrol robot mainly collects on-site images and infrared thermal image data, but the patrol robot cannot provide 24-hour all-round real-time monitoring and cannot achieve full coverage in time and space; and recently it mainly stays at the simple stages of on-site data collection and threshold judgment, and lacks the analysis technology of automatic and accurate processing and diagnosis of test data.

Figure 1:
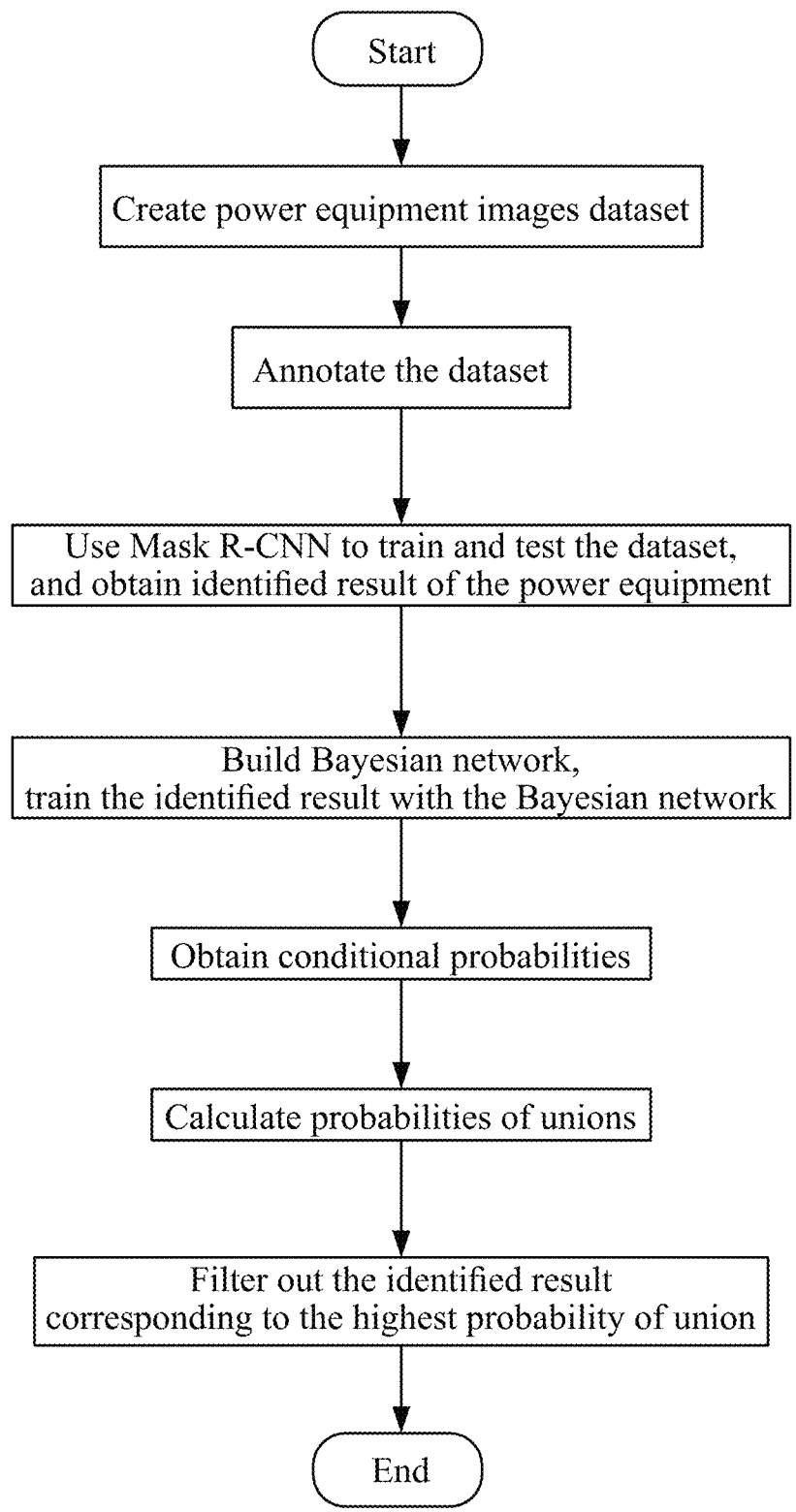
FIG. 1 shows a flowchart of a method for identifying power equipment targets based on human-level concept learning according to a first embodiment of the present disclosure.
Figure 2:
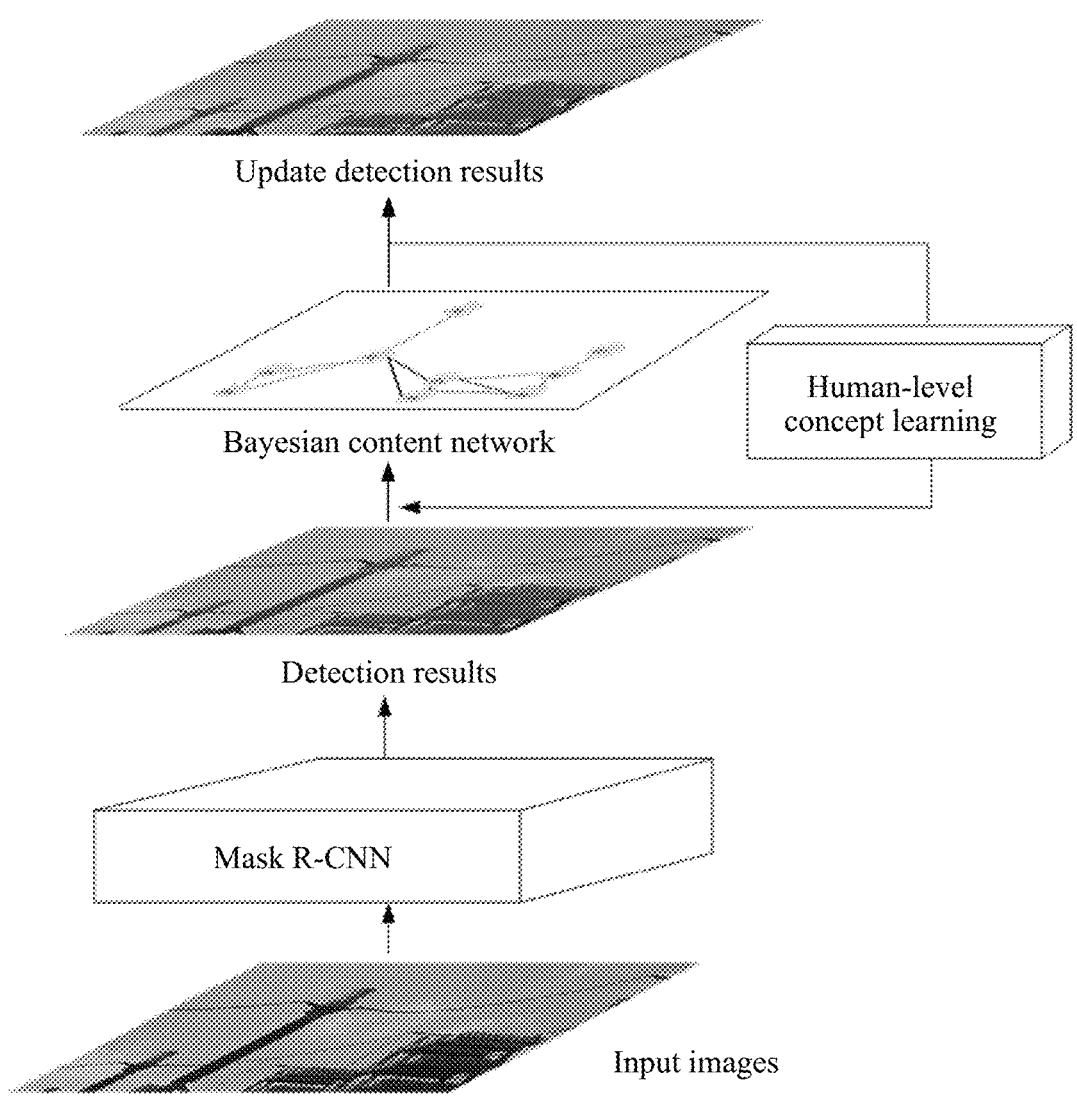
FIG. 2 shows an algorithm flowchart of the method of identifying power equipment targets based on human-level concept learning according to the first embodiment of the present disclosure.
Figure 3:
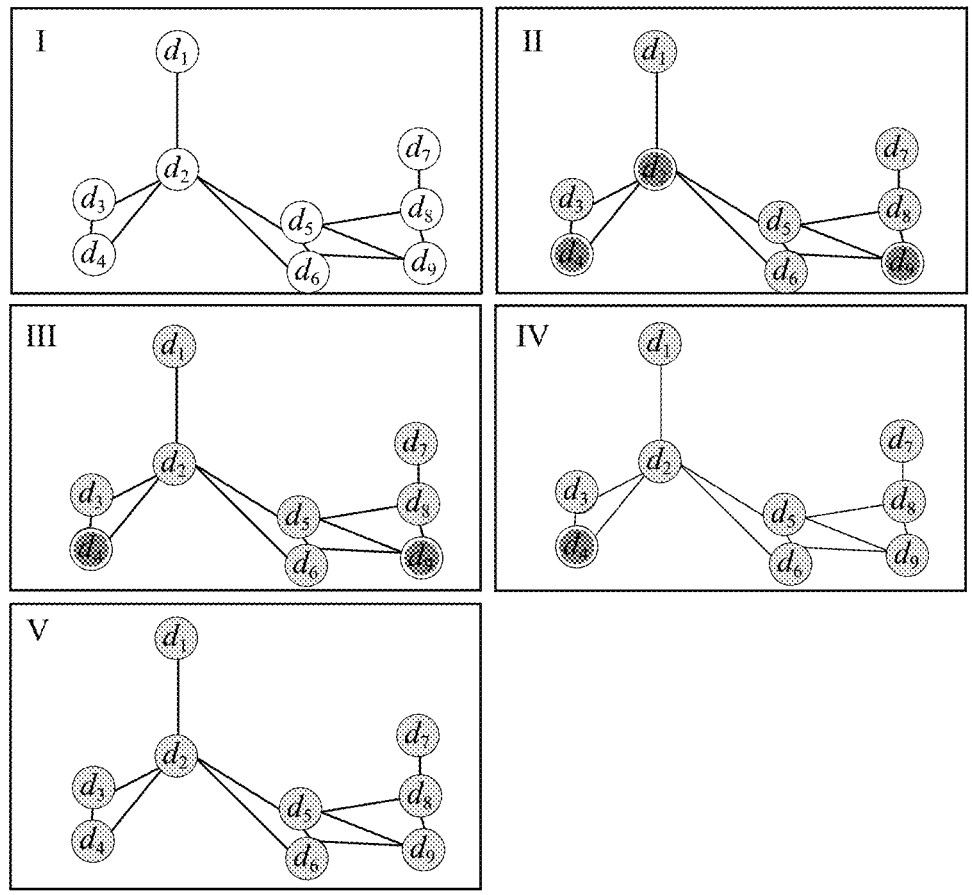
FIG. 3 shows a flowchart of correcting neural network recognition results of the method of identifying power equipment targets based on human-level concept learning according to the first embodiment of the present disclosure.

Referring to FIG. 1~3, which is a first embodiment of the present disclosure, and the embodiment provide a method for identifying power equipment target, and the method includes:

S1: creating and annotating a dataset of power equipment images, and annotating power equipment in the power equipment images.

The dataset has 750 said power equipment images taken by a detection robot in a substation, and the images are annotated with a VIA (VGG image annotator) annotation tool.

Power equipment contained in each of the power equipment images is annotated with the annotating tool. Annotating information and directed edge information are used to construct a corresponding directed acyclic graph, and annotation in each of the images is shown in FIG. 3. The annotating information include profile, type, and image quality information of the power equipment.

A json format file is generated after the images are annotated, and the file contains all the annotation information, and a profile information of the equipment in the annotation information is represent by polygons.

It should be noted that due to the use of the VIA annotation tool, there will be out-of-bounds annotation points during the annotating process, and two parts belonging to the same equipment due to blocking will also be annotated separately. Therefore, it is also necessary to perform data preprocessing on the images. The data preprocessing is divided into the following three parts:

(1) pull all points beyond four boundaries of the image back to the boundaries;
(2) separate the same equipment, merge the equipment with the same annotation name into a complete equipment, and generate a mask;
(3) randomly divide the dataset into training set and testing set, and the training set is used to train Mask R-CNN network, and the testing set is used to verify actual result of the Mask R-CNN network.

S2: Use the annotated dataset to train the neural network and Bayesian network to acquire an identification results and conditional probabilities respectively.

It should be noted that neural network Mask R-CNN is an instance segmentation model, which can determine location and category of each target in the image. The so-called "instance segmentation" refers to the segmentation of each interested object in a scene, regardless of whether they belong to the same category or not. For example, the model can identify isolated targets such as vehicles and people from street view video. To be specific, Mask R-CNN removes the original rounding operation, retains the calculated floating points, and uses bilinear interpolation to complete the pixel operation, achieving precise pixel-level alignment.

Every Mask R-CNN is flexible and variable within a certain range, and different network parameters can cause changes. After debugging, the final selected network parameters are as follows: learning rate: 0.02, epoch=30, steps per epoch=90, detection confidence=0.9, images per GPU=2.

Use the trained neural network to identify images of power equipment and output multiple identified results.

According to the real situation of the power equipment, set a threshold to filter the identified results. The threshold is set as a score threshold, and only the identified results having score parameters that is greater than the score threshold are filtered out, so that the Bayesian network can be re-filtered later. The identified results include rectangle parameter rois, class parameter class_ids, score parameter score, and masks parameter. Information of the masks parameter in the identified results is a three-dimensional Boolean matrix with a size of (924, 924, instance_number). The last parameter represents the number of instances identified by the mask R-CNN, that is, the mask number. Therefore, for each case, the mask can be expressed as masks [:, :, i], and the size is a two-dimensional Boolean matrix.

The Bayesian network is also called directed acyclic graph module, which is a probabilistic graphical model examine the properties of a set of random variables $\{X_1, X_2, \ldots, X_n\}$ and its n sets of conditional probabilities distribution according to the topological structure of the probability graph.

Use the trained Bayesian network to filter the identified results of the neural network, and filter out the most accurate identified results corresponding to the image of the power equipment.

Specific process: According to the selected multiple identified results, recalculate the corresponding vertices and directed edges information of the Bayesian network, construct the corresponding directed acyclic graph, and combine the conditional probability table obtained by training. Each of the vertex is set as an equipment, and each of the edge is set as a relationship between equipment.

It should be noted that each node of the Bayesian network contains 9 parameters, which are equipment type, relative area of equipment, abscissa of equipment centroid, ordinate of equipment centroid, abscissas of each marked points on equipment profile, coordinates of each marked point on the equipment profile, equipment serial number, equipment sub-vertices, and all pixels contained in equipment. The equipment type, the abscissa of the equipment centroid, the ordinate of the equipment centroid, and the equipment serial number can be obtained directly from the dataset json file.

Calculation of the remaining parameters is as follows:

a. Calculation steps of relative area of equipment is as follows:

The profile of each marked equipment is a polygon, and area of the polygon needs to be obtained through the coordinates of multiple vertices of the polygon. At first, area of each of the triangle is obtained by vector product, and then obtain the sum to obtain the final area. The definition of the vector product:

$$\vec{a} \times \vec{b} = |\vec{a}||\vec{b}|\sin\theta$$

Coordinates of three points is required while using the vector product. In addition of selecting the two vertices of the polygon each time, another reference point is required. Considering calculation convenience and concave and convex polygons, the origin is chosen as the reference point.

b. Since the coordinates of the vertices of the polygon are known, the coordinates of the centroid of the equipment is equal to the average of the coordinates of all vertices. The corresponding abscissa is the abscissa of the centroid of the equipment, and the ordinate is the ordinate of the centroid of the equipment.

c. In order to obtain the sub-vertices of the equipment, first convert the marked polygons of the vertex into a matrix with same format as the format of the Mask R-CNN output, and then perform a Mask operation on the image. Since the mask is a two-dimensional Boolean matrix, it is mainly determined whether to include the mask information corresponding to two vertices by using the "intersection" indicator, which is the area of the sharing part of the mask information. The corresponding information corresponding to the two vertices is divided by the two masks information. When the sharing area is greater than the threshold, there is an inclusion relationship between the two vertices, that is, equipment. Here, the fillPoly( ) function in the cv2 library is used to draw the area (1,1,1) where the polygon is located to obtain the three-dimensional pixel matrix in RGB format.

Each of the edges of the Bayesian network has two parameters, which are edge direction and edge weight.

Whether there is an edge between the two vertices is determined by whether the polygons corresponding to the two vertices extend outward and whether the bounding rectangles of five pixels has an intersection. The edge direction is based on pre-defined priority information, the vertex (i.e., equipment) with higher priority points to the vertex with lower priority. The edge weight is obtained by comparing relative positions and position matrix of each vertex with respect to the center of the polygon.

Building of the Bayesian network is divided into two parts, the import of the dataset and the building of the probability map, as shown below:

(1) Import of the dataset:

The image of the power equipment identified by Mask R-CNN training is used as the input of the Bayesian network.

(2) Building of the probability map:

The probabilities distribution of the entire power equipment image includes three parts: the first part is set to the probability expression that two equipment of the same type exist simultaneously is presented as follows, which is the probability that another equipment exists under the existence of certain type of equipment:

$$P_s = P(p_2|p_1,p_4)P(p_3|p_2,p_4)$$

and $p_1$ is probability of a first equipment existence, $p_2$ is probability of a second equipment existence, $p_3$ is probability of a third equipment existence, $p_4$ is probability of a fourth equipment existence.

The second part is set to the probability expression associated with the relative area of each equipment and type of equipment itself is presented as follows:

$$P_a = P(s_1|p_1)P(s_2|p_2)$$

and $s_1$ is relative area of the first equipment, $s_2$ is relative area of the second equipment.

The third part is spatial relationship probability, which is probability expression associated with the spatial relationship between two equipment and type of the two equipment, and the probability expression is presented as follows:

$$P_r = P(R_{1,2}|p_1,p_2)P(R_{2,3}|p_2,p_3)P(R_{3,4}|p_3,p_4)P(R_{4,5}|p_4,p_5)P(R_{5,6}|p_5,p_6)P(R_{6,7}|p_6,p_7)P(R_{7,8}|p_7,p_8)P(R_{8,9}|p_8,p_9)P(R_{9,10}|p_9,p_{10})$$

and $R_{1,2}$ is spatial relationship between the first and second equipment, $R_{2,3}$ is spatial relationship between the second and third equipment, $R_{3,4}$ is spatial relationship between the third and fourth equipment, $R_{4,5}$ is spatial relationship between the fourth equipment and a fifth equipment, $R_{5,6}$ is spatial relationship between the fifth equipment and a sixth equipment, $R_{6,7}$ is spatial relationship between the sixth equipment and a seventh equipment, $R_{7,8}$ is spatial relationship between the seventh equipment and an eighth equipment, $R_{8,9}$ is spatial relationship between the eighth equipment and a ninth equipment, $R_{9,10}$ is spatial relationship between the ninth equipment and a tenth equipment; $p_5$ is probability of the fifth equipment existence, $p_6$ is probability of the sixth equipment existence, $p_7$ is probability of the seventh equipment existence, $p_8$ is probability of the eighth equipment existence, $p_9$ is probability of the ninth equipment existence, $p_{10}$ is probability of the tenth equipment existence.

S3: Calculating probabilities of unions with the conditional probabilities.

probability expression of the unions is presented as follows:

$$\begin{aligned}P =\ & P_s P_a P_r \\=\ & P(p_2\mid p_1, p_4)P(p_3\mid p_2, p_4)P(s_1\mid p_1)P(s_2\mid p_2)P(R_{1,2}\mid p_1, p_2) \\& P(R_{2,3}\mid p_2, p_3)P(R_{3,4}\mid p_3, p_4)P(R_{4,5}\mid p_4, p_5)P(R_{5,6}\mid p_5, p_6) \\& P(R_{6,7}\mid p_6, p_7)P(R_{7,8}\mid p_7, p_8)P(R_{8,9}\mid p_8, p_9) \\& P(R_{9,10}\mid p_9, p_{10}).\end{aligned}$$

S4: Filtering the identification result corresponding to the highest probability of the union as identification result of the dataset of the power equipment images and complete the identification of the power equipment.

Embodiment 2

In order to verify and explain the technical effects of the present method, this embodiment selects a deep convolutional neural network R-CNN recognition method and the present method for comparative testing, and compares the test results by means of scientific demonstration to verify the real effect of the present method.

Recognizing images of power equipment through the deep convolutional neural networks requires a large amount of datasets, and also requires a lot of manual annotation time. Despite the rapid development of R-CNN, due to power issue, the equipment field lacks mature datasets and unique characteristics of power equipment categories, resulting in low identification accuracy.

In order to verify that the present method has higher identification accuracy and shorter running time than the traditional method, the following R-CNN recognition algorithm and the present method are used to identify and compare power equipment.

Testing environment:

CPU: 2.3 GHz; Memory: 12 GB; OS: win10 64-bit; Graphic card: GTX-TI. The program is complied in Python 3.5, and the training parameters are executed in the Tensorflow framework.

The dataset contains 750 images, 450 images of which are used as the training set, and the remaining 300 images are used as the test set. Import the weight parameters which R-CNN and Mask R-CNN used to train the 450 images of the training set respectively, and then identify the power images in the test set.

After filtering through the Bayesian network, the identificated result on the right is selected as the most accurate identification result corresponding to the image of the power equipment to be identified. The identified results are shown as table 1:

| Identification method | Identification rate | Identification speed |
|---|---|---|
| R-CNN recognition | 72% | 7.5 minutes |
| Presented method | 96% | 7 minutes |

The experiment shows that the preset method of the present disclosure only uses 750 annotated images as a dataset, and obtains a good identification compared with the R-CNN recognition. The mAP value (mean average precision, mean value of the average precision of each categories) output by the Mask R-CNN is successfully increased from 0.669 to 0.819, which is raised by 12%, and the effect is significant. Since the Bayesian network and Mask R-CNN are trained at the same time, and the Bayesian network training time is shorter than the Mask R-CNN training time, and the Bayesian network's verification of the Mask R-CNN output results takes almost no time, so the total running time of the program won't increase. It takes 5 hours to perform parameter training with R-CNN, while it only takes 2 hours to perform parameter training with the method of the present disclosure.

The invention claimed is:

1. A method for identifying power equipment targets based on human-level concept learning, including:
   creating and annotating a dataset of power equipment images;
   training a neural network and a Bayesian network with the annotated dataset and respectively acquire identification results and conditional probabilities;
   calculating probabilities of unions with the conditional probabilities; and
   filtering out the identification result corresponding to the highest probability of the union as an identification result of the dataset of the power equipment images and complete the identification of the power equipment.

2. The method of claim 1, wherein the dataset has: 750 said power equipment images taken by a detection robot in a substation, wherein the images are annotated with a VIA (VGG image annotator) annotation tool.

3. The method of claim 1, wherein process of the annotating includes:
   annotating power equipment contained in each of the power equipment images with a annotating tool, wherein annotating information and directed edge information are used to construct a corresponding directed acyclic graph.

4. The method of claim 3, wherein the annotating information includes:
   profile, type and image quality information of the power equipment.

5. The method of claim 4, wherein process of the training of the Bayesain network includes:
   calculating vertices and edges information of the corresponding Bayesian network to obtain a corresponding conditional probability table.

6. The method of claim 5, wherein the vertices include:
   equipment type, relative area of equipment, abscissa of equipment centroid, ordinate of equipment centroid, abscissa of each marked point on equipment profile, coordinates of each marked point on equipment profile, equipment serial number, equipment sub-vertices, and all pixels contained in equipment.

7. The method of claim 5, wherein the edges information includes: edge direction: based on defined priority information, the vertex with higher priority points to the vertex with lower priority; and edge weight: comparing relative positions and position matrix of each vertex with respect to the center of the polygon.

8. The method of claim 7, wherein the identification result includes:
   rectangular box parameters, category parameters, score parameters and mask parameters.

9. The method of claim 8, wherein the conditional probabilities include:
   probability expression that two equipment of the same type exist simultaneously is presented as follows:

$P_s = P(p_2|p_1,p_4)P(p_3|p_2,p_4)$ where $p_1$ is probability of a first equipment existence, $p_2$ is probability of a second equipment existence, $p_3$ is probability of a third equipment existence, $p_4$ is probability of a fourth equipment existence;
   probability expression associated with the relative area of each equipment and type of equipment itself is presented as follows:

$P_a = P(s_1|p_1)P(s_2|p_2)$ where $s_1$ is relative area of the first equipment, $s_2$ is relative area of the second equipment; and
   probability expression associated with the spatial relationship between two equipment and type of the two equipment is presented as follows:

$P_r = P(R_{1,2}|p_1,p_2)P(R_{2,3}|p_2,p_3)P(R_{3,4}|p_3,p_4)P(R_{4,5}|p_4,p_5)P(R_{5,6}|p_5,p_6)P(R_{6,7}|p_6,p_7)P(R_{7,8}|p_7,p_8)P(R_{8,9}|p_8,p_9)P(R_{9,10}|p_9,p_{10})$ where $R_{1,2}$ is spatial relationship between the first and second equipment, $R_{2,3}$ is spatial relationship between the second and third equipment, $R_{3,4}$ is spatial relationship between the third and fourth equipment, $R_{4,5}$ is spatial relationship between the fourth equipment and a fifth equipment, $R_{5,6}$ is spatial relationship between the fifth equipment and a sixth equipment, $R_{6,7}$ is spatial relationship between the sixth equipment and a seventh equipment, $R_{7,8}$ is spatial relationship between the seventh equipment and an eighth equipment, $R_{8,9}$ is spatial relationship between the eighth equipment and a ninth equipment, $R_{9,10}$ is spatial relationship between the ninth equipment and a tenth equipment;
   $p_5$ is probability of the fifth equipment existence, $p_6$ is probability of the sixth equipment existence, $p_7$ is probability of the seventh equipment existence, $p_8$ is probability of the eighth equipment existence, $p_9$ is probability of the ninth equipment existence, $p_{10}$ is probability of the tenth equipment existence.

10. The method of claim 9, wherein the probabilities of the unions include:
    probability expression of the unions is presented as follows:

$P = P_s P_a P_r$.

* * * * *